F. H. MORRIS.
POWER TRANSMISSION MECHANISM.
APPLICATION FILED OCT. 18, 1910.
1,011,830.
Patented Dec. 12, 1911.
3 SHEETS—SHEET 1.
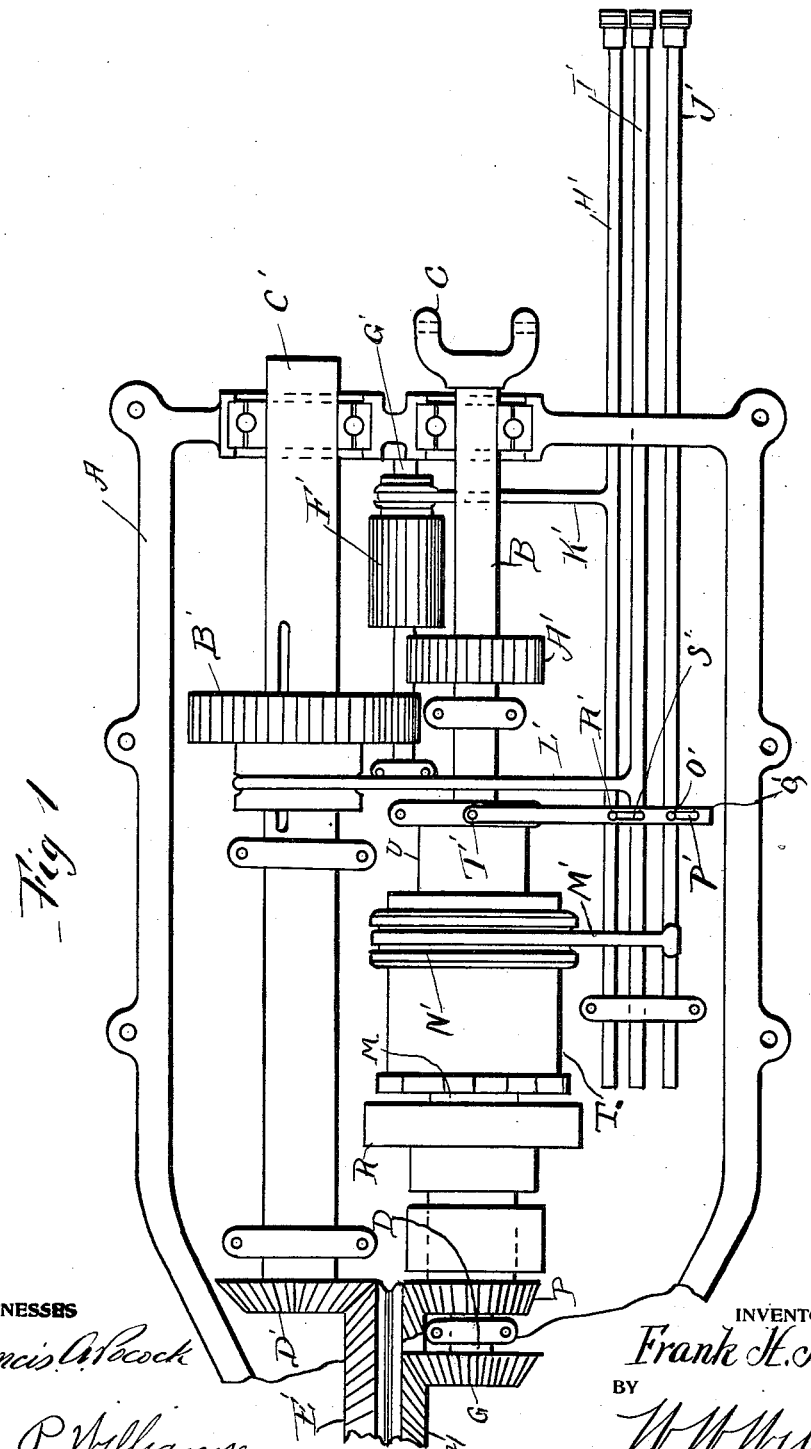
WITNESSES
Francis A. Pocock
M. P. Williamson
INVENTOR
Frank H. Morris
BY
W. W. Williamson
ATTORNEY

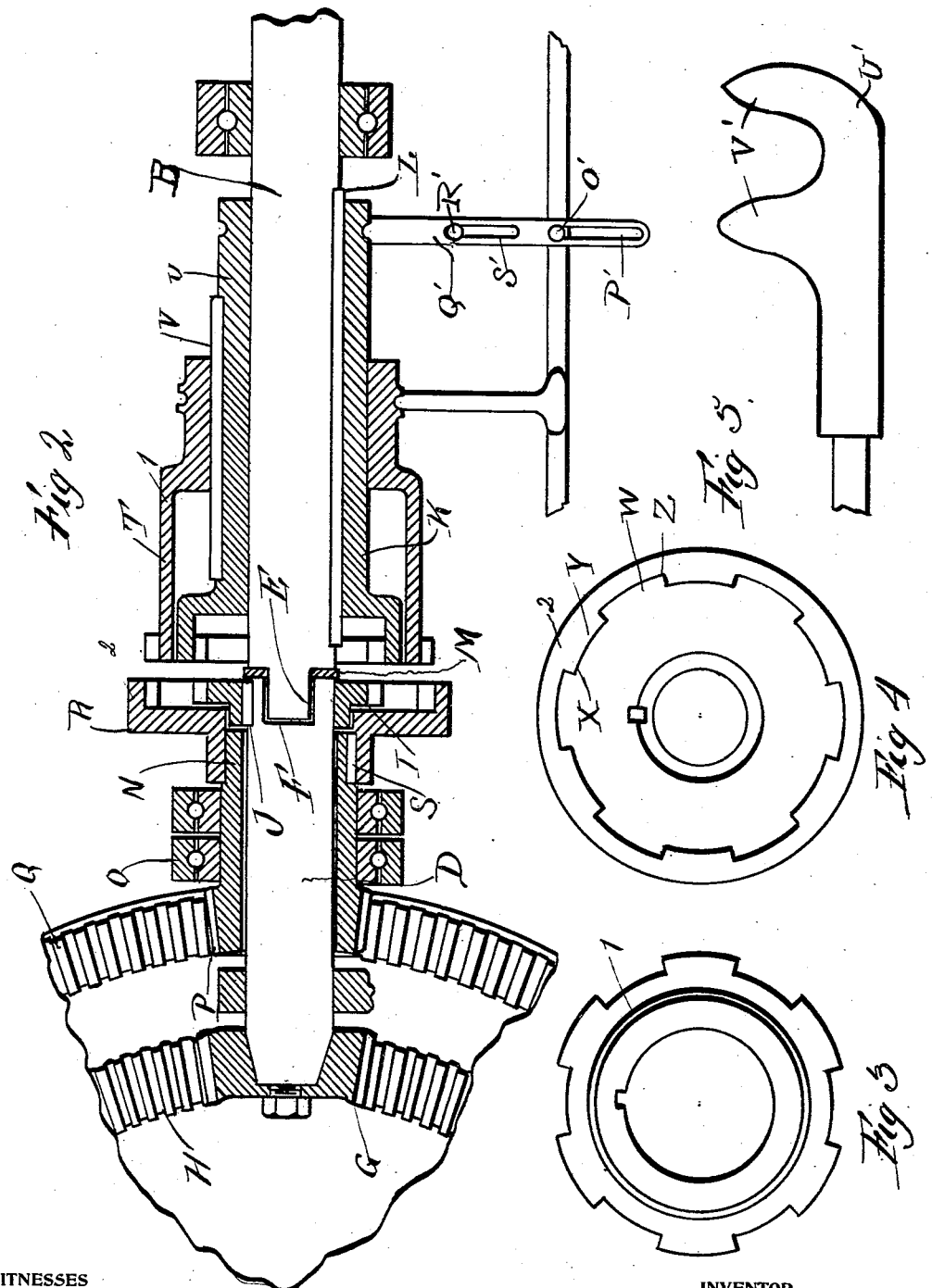

F. H. MORRIS.
POWER TRANSMISSION MECHANISM.
APPLICATION FILED OCT. 18, 1910.
1,011,830.
Patented Dec. 12, 1911.
3 SHEETS—SHEET 3.
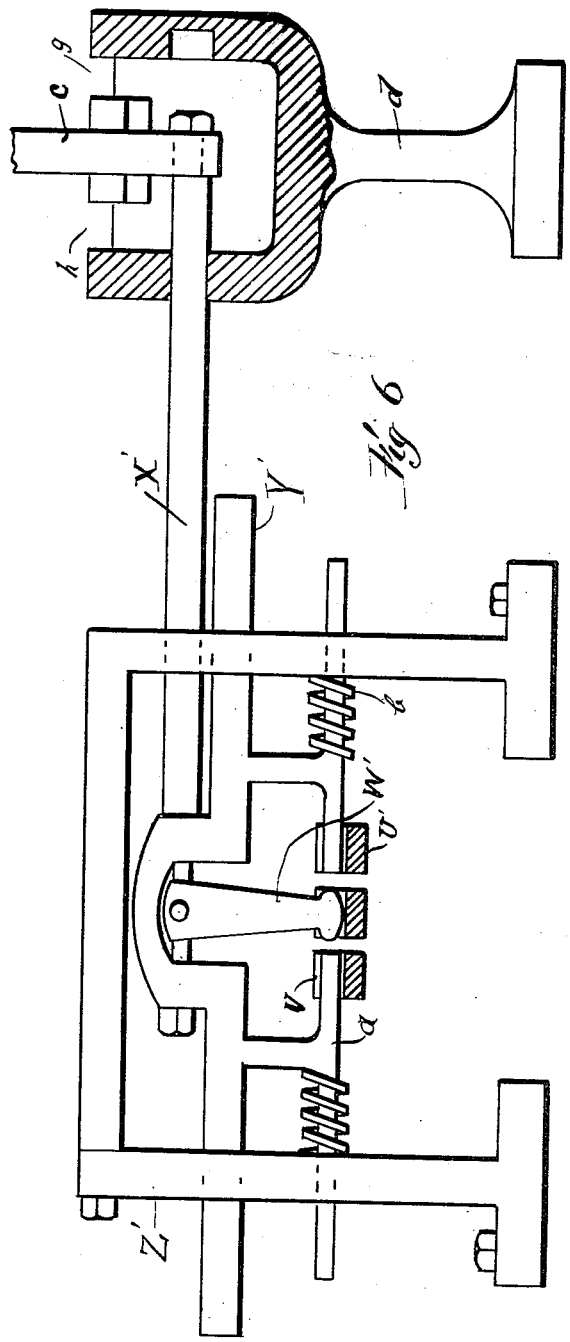
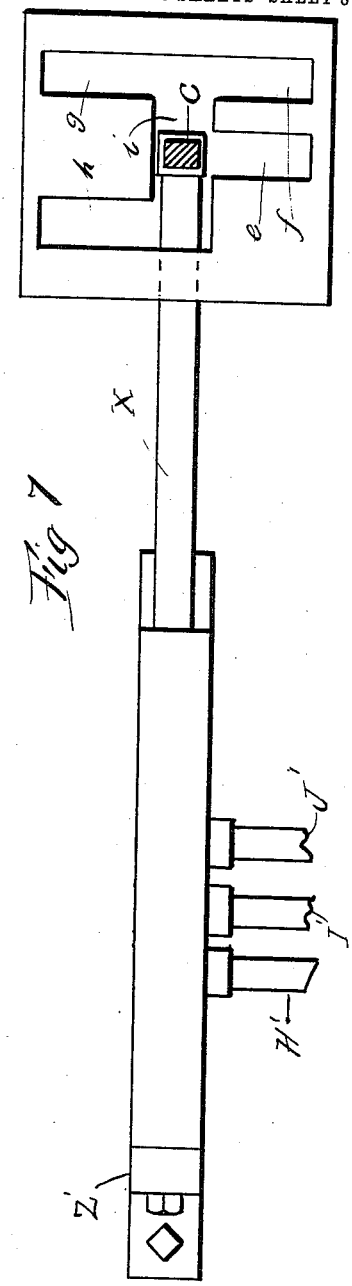
WITNESSES
INVENTOR
Frank H. Morris
BY
ATTORNEY

UNITED STATES PATENT OFFICE.

FRANK H. MORRIS, OF PHILADELPHIA, PENNSYLVANIA.

POWER-TRANSMISSION MECHANISM.

1,011,830. Specification of Letters Patent. Patented Dec. 12, 1911.

Application filed October 18, 1910. Serial No. 587,711.

*To all whom it may concern:*

Be it known that I, FRANK H. MORRIS, a citizen of the United States, residing at Philadelphia, in the county of Philadelphia and State of Pennsylvania, have invented a certain new and useful Improvement in Power-Transmission Mechanism, of which the following is a specification.

My invention relates to a new and useful improvement in power transmission mechanism, and has for its object to produce a device of this character in which two or more speeds may be obtained by a direct drive.

In accomplishing the above named object I form the shaft leading from the engine of two or more parts, each of the secondary parts being provided with a clutch member with which engages a clutch member carried by the main portion of the shaft, so that either of the secondary parts may be revolved. Each of these secondary parts carries a gear, each of which meshes with a different size gear, thus producing various speeds.

Another object of the invention is to provide for the different clutches and gears an improved method of shifting them.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a plan view of my improved power transmission mechanism, the upper half of the containing casing being removed and portions of said casing and the mechanism being broken away. Fig. 2, an enlarged longitudinal sectional view of the engine shaft clutches and driving pinions, showing the relation of the parts to the other mechanism. Fig. 3, an enlarged end view of the movable or sliding clutch used for obtaining the low direct drive. Fig. 4, a similar view of the stationary member of the same clutch. Fig. 5, an enlarged side elevation of the end of one of the shaft rods. Fig. 6, a side elevation of the shifting mechanism, the casting in which the lever is journaled being shown in section, and Fig. 7, a plan view thereof.

In carrying out my invention as here embodied, A represents a casing for containing the different parts of the mechanism. In this is journaled the shaft B, which leads directly from the engine, having a universal joint C. This shaft B is provided with a reduced end E, which is journaled in the bearing F formed in the end of said secondary shaft D; on the secondary member of the shaft is journaled a bevel pinion G which meshes with a bevel gear H, said bevel gear being mounted upon the differential, not shown, which is connected with the rear axle. On the secondary portion D is mounted a stationary clutch member I, which is caused to revolve and is fastened thereto by the key J. With this member engages the sliding clutch member K, slidably mounted upon the shaft B, and is held on said shaft by the key L or in any other suitable way of splining.

Upon the reduced end E is mounted a retaining washer M which is of greater circumference than the shaft so that its outer edge overlaps the stationary clutch member I to prevent said clutch member from becoming displaced, said washer being held in place by the shoulder formed between the different circumferences of the shaft and the reduced end thereof.

About the secondary shaft is mounted a pinion sleeve N which is journaled in suitable bearings O. This sleeve carries a bevel pinion P which meshes with the bevel gear Q, said gear being of greater diameter than the gear H. On the sleeve N is mounted the stationary clutch member R, the two being fastened together by the key S, and with this engages the sliding clutch member T mounted upon the shank U of the clutch member K and splined thereto by the key V, permitting it to slide backward and forward, in and out of engagement with the clutch member R.

Each of the stationary clutch members is provided on its periphery with external teeth W, leaving spaces X, with which register the internal teeth Y of the sliding clutch member, the external teeth W entering the spaces Z between the teeth Y. By using clutches of this description they are less likely to become disengaged during the operation of the machine.

From the foregoing description it will be seen that while the shaft B is revolving, the sliding clutch member T may be caused to engage the stationary clutch member R, at which time the clutch members T and R and the bevel pinion P will revolve simultaneously, operating the lower speed gear Q, it being understood that the gear H being concentric with the gear Q will also revolve, causing the pinion G and the secondary shaft D to do likewise, but at a lower speed, said secondary shaft revolving on the trunnion E. When the sliding clutch member T is withdrawn from the stationary clutch member R, the sliding clutch member K may be drawn into engagement with the stationary clutch member I, which will cause the secondary shaft D to revolve, and as this carries the bevel pinion G meshing with the bevel gear H, said gear will revolve, giving a higher speed to the shaft on which it is mounted, because its diameter is smaller than that of the gear Q. On the shaft B is mounted a relatively small gear A', with which a relatively large gear B' may be caused to mesh, said gear being splined or slidably mounted upon the short shaft C', which is journaled in suitable bearings in the casing A. On one end of this shaft is mounted the bevel pinion D' meshing with the bevel gear E', said gear being mounted coaxial with the bevel gears H and Q, and when the gears A' and B' are in mesh the lowest speed is obtained, and to reverse the mechanism I provide a pinion F' having a very wide face, and slidably mounted upon the shaft G'. When said pinion F' is moved into engagement with the gears A' and B', it being understood that they are out of mesh with one another, the motion of the gear B' will be reversed, thus reversing the bevel gear E' and the shaft on which it is mounted.

H', I' and J' are shifting rods, the rod H' having a fork K' which engages the hub of the pinion F' for shifting the same. The rod I' carries a fork L' which engages the hub of the gear B' for sliding said gear along the shaft C' when the rod I' is operated. The rod J' has mounted thereon a fork M', which fork engages the collar N' carried by the sliding clutch member T. Said rod J' also carries a pin O' which operates in the slot P' in the lever Q', said lever being pivoted upon the pin R' and allowed freedom of movement because of the slot S'. This lever is pivoted at T' to the shank U of the sliding clutch member K.

From the description it will be seen that by moving the shifting rod H' the pinion F' will be moved into and out of mesh with the gears A' and B' and when in mesh with both of said gears, the motion of the gear B' will be reversed, which motion is transmitted to the propelling wheels of the vehicle. When the shifting rod I' is operated, the gear B' will be moved into and out of engagement with the gear A' and when said gear B' is in mesh with the gear A' the low gear is then operating. With the movements of the shifting rod J', one of the sliding clutch members is brought into engagement with its stationary clutch member, and if the other sliding clutch member is in engagement with its stationary clutch member it will be withdrawn, since as the shifting rod J' is moved to bring the sliding clutch member T with its clutch member R, the lever Q' fulcrumed at R' will withdraw the sliding clutch member U and when the shifting rod J' is moved oppositely the clutch member U will be brought into engagement with the clutch member I, while the clutch member T will be withdrawn from the clutch member R, or they may be both brought to the new position, as shown in Fig. 1 when neither of the clutches are in engagement.

Each of the shaft rods is provided with a bifurcated head U', thus producing ears V' between which operates the depending arm W', which is mounted upon the side lever rod X', said rod being journaled in the sliding carriage Y' mounted in the frame Z'. Said sliding carriage has formed therewith the locking arms $a$ which are also slidably mounted in the frame Z' and have coiled about them springs $b$, whose tension is relatively light, and are only necessary to permit the operator to know when the side lever $c$ is in the neutral position or ready to operate the low speed.

$d$ is a bracket, in the top wall of which are formed the slots $e$, $f$, $g$ and $h$, all of which are in communication through the slot $i$.

The side lever rod X' extends into the bracket $d$ and the side lever $c$, which is mounted thereon passes through the slots $e$, $f$, $g$, $h$, and $i$, so that by moving said side lever through the slot $i$ it will be brought into alinement with one of the other slots, which will move the depending arm W' into engagement with one of the shifting rods, at the same time the locking arms $a$ will be moved in and out of engagement with the remaining shifting rods, at which time the rod with which the depending arm W' is in engagement may be operated through the side lever $c$, the remaining shifting rods being held in their neutral positions by the locking arms $a$.

Of course I do not wish to be limited to the exact details of construction here shown as these may be varied within the limits of the appended claims without departing from the spirit of my invention.

Having thus fully described my invention, what I claim as new and useful, is—

1. In combination, a casing, a shaft having a reduced end journaled in said casing, a secondary shaft having a bearing in the inner end thereof in which is journaled said reduced end, two different sized coaxial beveled gears, a beveled pinion mounted upon the secondary shaft, meshing with the smaller of the beveled gears, a sleeve journaled upon the secondary shaft, a beveled pinion carried thereby, said pinion meshing with the larger of the beveled gears, a clutch member keyed to the secondary shaft, another clutch member keyed to the sleeve, a clutch member splined to the main shaft adapted to engage the clutch member mounted upon the secondary shaft, another clutch member splined to the last named clutch member adapted to engage the clutch member mounted upon the sleeve, a gear mounted upon the main shaft, a short shaft journaled in the casing, a gear slidably mounted thereon adapted to engage with the gear mounted upon the main shaft, a beveled pinion mounted upon one end of the short shaft, a beveled gear coaxial with the other two beveled gears and in mesh with the last named beveled pinion, another shaft journaled in the casing, a wide faced pinion slidably mounted thereon adapted to engage the gears mounted upon the main shaft and the short shaft for reversing the mechanism, and means for shifting the sliding gears and the sliding clutch members.

2. In combination, a casing, a shaft journaled therein, a secondary shaft also journaled in the casing in alinement with the main shaft, the end of one shaft being journaled in the meeting end of the adjacent shaft, two different sized coaxial beveled gears, a beveled pinion mounted directly upon the secondary shaft meshing with the smaller of the beveled gears, a sleeve journaled upon the secondary shaft, a beveled pinion carried thereby meshing with the larger of the beveled gears, means for connecting the main shaft to the secondary shaft for causing them to revolve together, means for connecting the sleeve carrying the beveled pinion to the main shaft for causing them to revolve together, and a shifting and locking mechanism for operating said connecting means.

3. In combination, a casing, a shaft journaled therein, a secondary shaft also journaled in the casing in alinement with the main shaft, the end of one shaft being journaled in the meeting end of the adjacent shaft, two different sized coaxial beveled gears, a beveled pinion mounted directly upon the secondary shaft meshing with the smaller of the beveled gears, a sleeve journaled upon the secondary shaft, a beveled pinion carried thereby meshing with the larger of the beveled gears, a clutch member mounted upon the secondary shaft, a sliding clutch member mounted upon the main shaft, means for operating and locking the sliding clutch member, another clutch member carried by the sleeve, a coacting clutch member slidably mounted upon the first named sliding clutch member, and means for shifting the last named clutch member.

In testimony whereof, I have hereunto affixed my signature in the presence of two subscribing witnesses.

FRANK H. MORRIS.

Witnesses:
  EDW. W. AUSTIN,
  M. E. YOST.